3,745,179
DIENE SYNTHESIS USING ISOPRENE AND CITRACONIC ACID ANHYDRIDE, AND HYDROGENATION OF SYNTHESIS PRODUCT
Gunther Ibing, Gladbeck, and Kurt Neubold and Herbert Haferkorn, Bottrop, Germany, assignors to Veba-Chemie AG, Gelsenkirchen-Buer, Germany
No Drawing. Filed Oct. 29, 1969, Ser. No. 872,350
Int. Cl. C07c 61/28
U.S. Cl. 260—346.6     7 Claims

ABSTRACT OF THE DISCLOSURE

A diene synthesis using isoprene and citraconic acid anhydride as reactants to produce an isomeric mixture of dimethyltetrahydrophthalic acid anhydrides, which can be hydrogenated to produce an isomeric mixture of the corresponding hexahydro compounds. The compounds produced are liquid hardeners for epoxy resins.

---

The invention relates to a process for the productcion of liquid mixtures of dicarboxylic acid anhydrides from citraconic acid anhydride (in the following called CAA) by the diene synthesis. Said invention comprises reacting citraconic acid anhydride and isoprene, under conditions inhibiting polymerization. If desired, product can be hydrogenated.

BACKGROUND

It is known that liquid dicarboxylic acid anhydrides, and dicarboxylic acid anhydride mixtures are hardeners for epoxy resins, because they offer, in contrast to the solid anhydrides, technical advantages. Thus today, liquid anhydrides, and anhydride mixtures, for example 4-methyl-hexahydrophthalic acid anhydride, methyl-endomethylene tetrahydrophthalic acid anhydride, dodecenylsuccinicanhydride, isomeric mixtures of tetrahydrophthalic acid anhydride and 4-methyl-tetrahydrophthalic acid anhydride, mixtures of these with one another or with cis-Δ-4-tetrahydrophthalic acid anhydride and hexahydrophthalic acid anhydride, among others, are widely used in this field. Such products are obtained by converting maleic acid anhydride with dienes and olefines.

The use of CAA, instead of maleic acid anhydride, in known diene synthesis reactions, in the case of most of the dienes leads to solid anhydrides; only in few cases, for example during the conversion with butadiene, do liquids result, which, however, after a short period of time develop crystal precipitates. The diene synthesis of CAA with isoprene as diene thus far has not been described in the literature.

An essential disadvantage of the liquid anhydride hardeners used thus far, is their sensitivity to moisture, thus making their handling difficult in that the acids recrystallize, and the acids are difficult to dissolve in the anhydride, faster or slower in smaller or larger amounts thereof, which means that the hardeners before the insertion by filtration or heating have to be homogenized again.

As indicated the invention involves reacting isoprene and citraconic acid anhydride under conditions inhibiting polymerization, for example in the presence of a polymerization inhibitor, to produce tetrahydrophthalic acid anhydrides, and, if desired hydrogenating to produce the corresponding hexahydroanhydrides.

The said products are used as hardeners for epoxy resins in molar amounts, and otherwise just as the aforementioned known hardeners are used.

MOISTURE SENSITIVITY

It is surprising that by the process in accordance with the invention, liquid anhydride mixtures are obtained, the sensitivity of which to moist air is by far less than with other thus far known liquid anhydride hardeners. In Table 1 under number 5 and 6 the time is given at which the first crystallization begins during storage in a steam saturated atmosphere at room temperature. For comparison, under Nos. 1–3, the time period for the start of the crystallization of three other liquid hardeners is given, whose stability against hydrolytic influence thus far had been considered to be especially good.

TABLE 1
[Beginning of crystallization at room temperature in steam saturated atmosphere]

| No. | Hardener | Time in hours until the beginning of the crystallization |
|---|---|---|
| 1 | 4-methyl-hexahydrophthalic acid anhydride | 16 |
| 2 | 4-methyl-tetrahydrophthalic acid anhydride-isomeric mixture. | 24 |
| 3 | Diisobutenyl-succinicanhydride | 40 |
| 4 | Dimethyl-tetrahydrophthalic acid anhydride-isomeric mixture. | 90 |
| 5 | Dimethyl-hexahydrophthalic acid anhydride-isomeric mixture. | (¹) |

¹ After a period of 8 days a clear, highly viscous matter.

Especially remarkable is the conduct of the dimethyl-hexahydrophthalic acid anhydride isomeric mixture in which after a storage of 8 days in steam saturated atmosphere no crystallization occurs; however, a gradual increase of the viscosity takes place, and after a period of more than 14 days the matter solidified into a glassy matter.

It is also remarkable that in the dimethyl-tetrahydrophthalic acid anhydride isomer mixture after the appearance of the first crystallization hardly any further formation of nucleii takes place and that the growth of the crystals occurred so slowly and was so strictly oriented, that one can pour off the excess mother liquor in clear condition, while the customary liquid hardeners after the beginning of the crystallization quickly become completely turbid.

Table 2 quantitatively shows the hydrolysis velocity in pyridine solutions of the substances from Table 1, expressed in the water adsorption in grams of water per mol of substance after one hour, and by the quantity of anhydride in percent, which after one hour changed into the acid. For the latter, using pyridine as the solvent, 0.1 mol of anhydride were mixed with 0.02 mol of water and after one hour standing at 20° C. the water which had not been used was back titrated, in accordance with Karl Fischer.

TABLE 2
[Hydrolysis velocity in pyridine]

| No. | Hardener | Water absorption after 1 hour in g. H₂O/mol substance | After 1 hour, converted anhydride in percent |
|---|---|---|---|
| 1 | 4-methyl-hexahydrophthalic acid anhydride. | 3.15 | 17.5 |
| 2 | 4-methyl-tetrahydrophthalic acid anhydride-isomeric mixture. | 2.92 | 16.2 |
| 3 | Diisobutenyl-succinic-anhydride | 1.60 | 8.9 |
| 4 | Dimethyl-tetrahydrophthalic acid anhydride-isomeric mixture. | 1.19 | 6.6 |
| 5 | Dimethyl-hexahydrophthalic acid anhydride-isomeric mixture. | 0.26 | 1.5 |

This table too shows the considerably lower hydrolysis sensitivity of the new anhydrides in contrast to liquid anhydrides which up till now were considered to be especially low in their hydrolysis sensitivity.

VISCOSITY AND POT LIFE

The liquid anhydride mixtures produced in accordance with the invention in comparison to the thus far commonly used liquid hardeners, have the advantage which is by far a deciding factor, that their viscosity is substantially lower, whereby the mixing of epoxy resin-hardener combination and the application thereof has become much easier. Furthermore, the use of solvents is, in many instances, not necessary; this can result in an improvement of the quality of the resin. And finally, an extension of the pot life is obtained which in many instances is meaningful.

Table 3 shows the low viscosity of the materials in question in contrast to the other comparison substances from Table 1.

TABLE 3
[Viscosity of hardeners at different temperatures]

| No. | Hardener | Viscosity in cp. at— | | | |
|---|---|---|---|---|---|
| | | 20° C. | 30° C. | 40° C. | 50° C. |
| 1 | 4-methyl-hexahydrophthalic acid anhydride. | 81.8 | 43.8 | 25.7 | 16.7 |
| 2 | 4-methyl-tetrahydrophthalic acid anhydride-isomeric mixture. | 63.1 | 33.5 | 20.3 | 13.3 |
| 3 | Diisobutenyl-succinic anhydride | 218.7 | 90.5 | 44.2 | 25.1 |
| 4 | Dimethyl-tetrahydrophthalic acid anhydride-isomeric mixture. | 25.2 | 15.8 | 10.4 | 7.5 |
| 5 | Dimethyl-hexahydrophthalic acid anhydride-isomeric mixture. | 46.0 | 26.6 | 16.9 | 11.5 |

PROCESS

The process in accordance with the invention is generally in accordance with known diene syntheses, but it differs in some respects from the known reactions of CAA and dienes other than isoprene.

(1) In the prior art, a solvent or an excess of diene is used as a solvent. While the process of the invention can be performed without solvent and with an excess of isoprene of less than about 5 weight percent above the theoretical amount.

(2) In the process as known thus far, the yields are generally very low; yields above 90% have not been achieved at all. The reason for this is the more or less high formation of resin and the small conversion in the usual diene reaction, since CAA in comparison to maleic anhydride has a substantially lower reactivity. In the process in accordance with the invention, however, yields of more than 95% with regard to the CAA conversion are obtained and the conversions are above 90%. Mild conditions for the reaction and the use of few parts of a polymerization inhibitor avoid the formation of resin altogether.

In the process in accordance with the invention, one can work with pressure as well as without pressure. In the reaction under pressure, CAA and isoprene, in a mol ratio of 1:1 to 1:1.05, together with 0.02–0.1%, especially 0.025–0.05%, of a polymerization inhibitor, for example hydroquinone, and while stirring 5–38 hours, especially 10–15 hours, are heated to a temperature between room temperature and 120° C., especially between 70 and 90° C., with an initial nitrogen pressure of 5 atm., whereby a maximum pressure of approximately 8 develops.

When executing the reaction without pressure, in which the amount of reactants and inhibitor is the same as in the pressure reaction, higher temperatures are necessary in order to obtain the same conversions as with pressure. For obtaining a high yield with regard to isoprene, the isoprene should be passed through the reaction medium. The isoprene is fed into the CAA from an evaporator in a gaseous, finely divided form, and the unconverted isoprene is recirculated. The temperatures for the reaction here range between 100° C. and the boiling point of CAA, especially between 130° C. and 150° C., the reaction times range between 2 and 6 hours. Dropping in of liquid isoprene into the hot melt leads to strong resinifications.

The reaction can also be performed, under mild overpressure of up to a maximum of 0.5 atm. at below 100° C., if for example, the temperature is raised slowly from 20° C. to 70° C. corresponding to the proportionate use of isoprene, whereby despite the substantially longer times for the reaction, one has to accept lower yields and conversions.

Raw products obtained in accordance with these modes of operation, can, for example, be purified in such a manner that the unconverted isoprene and CAA are distilled off in the vacuum and in accordance with the need, the remainder either is treated with bleaching earth or distilled in vacuum. Products are obtained whose content calculated in dimtehyl-tetrahydrophthalic acid anhydride range between 99.5 and 100%. The conversion with regard to CAA and thus also with regard to isoprene are above 90%, the yields with regard to the converted CAA are above 95%.

The raw products obtained in accordance with the above described procedures, consisting essentially of dimethyl-tetrahydrophthalic acid anhydride, can be changed by the hydrogenation of their double-bond in known manner, for example, under little pressure of hydrogen and with the aid of nobel metal or nickel catalysts, into the corresponding dimethyl-hexahydrophthalic acid anhydrides, whose refining after separation of the catalyst can be executed in the same manner as done with the dimethyl-tetrahydro-derivatives.

The following examples will illustrate the process in accordance with the invention.

EXAMPLE 1

448 g. CAA (4 mol), 285 g. isoprene (4.2 mol) and 0.2 g. hydroquinone as a polymerization inhibitor, are brought to 85° C. in an autoclave with a nitrogen pressure of 5 atm. and by stirring, and are kept at this temperature for 12 hours, whereby a maximum pressure of 7.8 atm. sets in, which reduces with the continuous reaction to 6 atm. One obtains 713 g. of raw product from which by degasing in the vacuum at room temperature, 14 g. isoprene (4.9% of the insertion) are obtained.

The remaining 699 g. of the raw product are distilled in the vacuum.

After a pre-run of 43 g. ($K_{p4}$=32–118°, equivalent weight=63 corresponding to a content of approximately 80% CAA), one obtains 643 g. dimethyl-tetrahydrophthalic acid anhydride mixture in form of a water-clear liquid, that is 96.7% of the theory, with regard to the CAA-conversion and 92.6% of the theory with regard to the isoprene conversion.

Some characteristic data of the anhydride mixture are:

| | |
|---|---|
| $K_{p755}$ | ° C__ 279–281 |
| $K_{p4}$ | ° C__ 118–120 |
| Content | percent__ 99.9 |
| $n_D^{20}$ | 1.4840 |
| Viscosity at 20° C. | cp__ 25 |
| Flame point acc. to Deutsche Industrie Norm 51758 | ° C__ 147 |

As distillation residues remain 5.5 g.=0.8% of the inserted distillation in form of an easily removable liquid.

EXAMPLE 2

785 g. CAA (7 mol), 497 isoprene (7.3 mol) and 0.35 g. hydroquinone are brought to 85° C. in an autoclave at a nitrogen pressure of 5 atm. and by stirring, and kept at this temperature for 10 hours.

One obtains 1261 g. raw product from which by degasing in the vacuum at room temperature, 57 g. isoprene (11.5% of the insertion) can be re-obtained.

From the 1204 g. remaining raw product, the unconverted CAA is distilled off in the vacuum, whereby 86 g. CAA with a boiling point of 4 torr=33–118° C. and an equivalent weight of 62 corresponding to a content of 82% CAA are obtained.

The remaining 1118 g. raw product, which are turbid and colored yellowish, are treated with 11.2 g.=1% tonsil for 30 minutes at 70° C.; after the filtration, 1100 g. water clear, somewhat yellowish colored anhydride mixture which corresponds to a yield of 95.7% of the theory with regard to the CAA conversion and 94.4% of theory with regard to the isoprene conversion.

The physical data are:

Content _____ percent__ 100.0
$n_D^{20}$ _____ 1.4843
Viscosity at 0° C. _____ cp__ 25

EXAMPLE 3

In a three-necked flask which holds 1 liter, which has a stirrer, a gas feed and a gas exit, 336 g. CAA in an oil bath are heated to 150° C. From an evaporator loaded with 400 g. isoprene and 0.05% hydroquinone, isoprene vapor which had been overheated to 150° is fed continuously into the CAA by heavy stirring. Hereby one part of the isoprene reacts, and the unconverted part is condensated in a cooler and fed to the isoprene evaporator again. After 2.5 hours no remarkable decrease of the isoprene in the evaporator can be noted; after 3 hours the reaction is broken off.

Based on the isoprene remaining in the evaporator, i.e. 193.5 g., 206.5 g. of isoprene are used.

One obtains 528.2 g. raw anhydride mixture which are distilled in the vacuum. After a pre-run of 8.6 g. ($K_{p4}$ =32–118°, equivalent weight=63 corresponding to the content of CAA of approximately 80%) one obtains 505.4 g. dimethyl-tetrahydrophthalic acid anhydride mixture; that is 95.4% of the theory with regard to the CAA conversion and 92.5% of the theory with regard to the isoprene conversion.

The physical data are:

$K_{p4}$ _____ °C__ 118–120
Content _____ percent__ 99.8
$n_D^{20}$ _____ 1.4841
Viscosity at 20° C. _____ cp__ 24

Distillation remainder is 12.5=2.4% from the distillation feed.

EXAMPLE 4

In a 250 ml. flask which is connected with a manometer, 112 g. (1 mol) CAA, 711.5 g. (1.05 mol) isoprene and 0.056 g. hydroquinone are heated to 40° C. in the water-bath, whereby an overpressure of approximately 400 torr sets in, which after 23 hours reduced to approximately 300 torr. Now the reaction temperature is raised to 50° C., whereby an overpressure of approximately 500 torr results, which after 25 hours reduces to approximately 200 torr. After 48 hours the reaction is stopped.

One receives 181.5 g. raw product which at first is freed from the excess isoprene, whereby 20.5 g. of isoprene (28.7% from the insertion) are recovered. The remaining raw product of 161 g. is distilled in the vacuum at about 4 torr. After a pre-run of 32.7 g. ($K_{p4}$=75–118° C. equivalent weight=58.1, corresponding to a CAA content of approximately 94%) one obtains 112 g. dimethyl-tetrahydrophthalic acid anhydride isomer mixture; that is 86.4% of the theory with regard to the CAA conversion, or 83% of the theory with regard to the isoprene conversion.

The physical data are:

$K_{p4}$ _____ °C__ 118–120
Content _____ percent__ 99.0
$n_D^{20}$ _____ 1.4841
Viscosity at 20° C. _____ cp__ 23

Distillation remainder is 5.0 g.=0.3% from the distillation insertion.

EXAMPLE 5

950 g. dimethyl-tetrahydrophthalic acid anhydride isomere mixture (raw product from the Examples 1–4 after removal of the excess isoprene and CAA) are hydrogenated with 28.5 g.=3% nickel on Kieselguhr (with 60% Ni) in an autoclave at 10 atm. hydrogen pressure in a liquid phase without the addition of a solvent at 140–155° C. The strong exothermic reaction is finished after 3 hours. The catalyst is filtered off and the filtrate is distilled in the vacuum. After a distillation insertion of 917 g. one obtains after a pre-run of 12 g.=1.3% (with a $K_{p2}$=110–122° C.), 870 g.=94.9% colorless waterclear dimethylhexahydrophthalic acid anhydride isomere mixture with a $K_{p2}$=122–124° C. The yield with regard to the inserted dimethyltetrahydrophthalic acid anhydride isomere mixture amounts to 91.6%.

The physical data are:

$K_{p751}$ _____ °C__ 270–271
Content _____ percent__ 99.5
$n_D^{20}$ _____ 1.4704
Viscosity at 20° C. _____ cp__ 46

Distillation remainder is 25 g.=2.7% from the distillation insertion.

It is surprising that the diene synthesis reaction of the invention, and that synthesis coupled with hydrogenation, produce liquid products. By "liquid" is meant liquid at room temperature.

The reactions and products of the invention are indicated in the following notation.

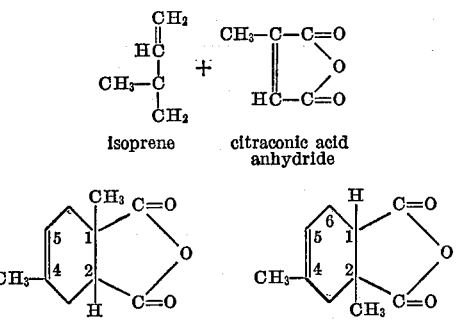

isomeric mixture of dimethyl-tetrahydrophthalic anhydrides (or more exactly 1.4-dimethyl-Δ4-cyclohexene-1.2-dicarboxylic acid anhydride and 2.4-dimethyl-Δ4-cyclohexene-1.2-dicarboxylic acid anhydride).

Hydrogenation under conventional hydrogenation conditions for diene synthesis products results in isomeric mixture of corresponding hexahydrophthalic acid anhydrides (or more exactly 1.4-dimethylcyclohexane-1.2-dicarboxylic acid anhydride and 2.4-dimethyl-cyclohexane-1.2-dicarboxylic acid anhydride).

Percentages are by weight unless otherwise indicated. Temperatures are in ° C. unless otherwise indicated.

The new hardeners are suitable for the hardening of different epoxy resin types, e.g. the types Epikote 815, 822, 871, 872, 1031 and 1010, epoxy resin types, which contain beside epichlorhydrine not only diphenylolpropane, but also aliphatic dicarboxylic acids, mixtures of diphenylolpropane and aliphatic dicarboxylic acids and diphenylolethane. Preferably liquid or low melting epoxy resins are used so that use of a solution isn't necessary. The products of the invention are normally used in quantities of 0.8–1.1 mol per epoxide equivalent weight. In general the hardening is done by heating a room-temperature-produced epoxy resin, hardener mixture for 1 hour at 100° C. and then 2 hours at 150° C.

The products of the invention, compared to known liquid hardeners, beside lower vapor pressure, have a lower moisture sensitivity and a lower viscosity, as described in the following: Casting resins according to the invention don't suffer a injury of their mechanical, electrical and thermal properties compared to those resins produced with the known anhydride hardeners, especially the cyclohexene- and cyclohexane dicarboxylic acid derivatives.

Herein, for example, $K_{p4}$ means boiling point at 4 torr.

What is claimed is:
1. Process comprising diene synthesis wherein:
   (a) isoprene is contacted with
   (b) citraconic acid anhydride
   (c) under conditions inhibiting polymerization
   (d) at a temperature and pressure and for a time sufficient for reaction of the isoprene and citraconic acid anhydride to produce
   (e) as product a liquid isomeric mixture of 1,4-dimethyl-4-cyclohexene - 1,2 - dicarboxylic acid anhydride and 2,4-dimethyl-4-cyclohexene-1,2-dicarboxylic acid anhydride.
2. Process according to claim 1, wherein said product is hydrogenated to a liquid isomeric mixture of 1,4-dimethylcyclohexane - 1,2 - dicarboxylic acid anhydride and 2,4-dimethylcyclohexane-1,2-dicarboxylic acid anhydride.
3. Process according to claim 1, wherein isoprene admixed with 0.02–0.1% of a polymerization inhibitor, as a gas in overheated condition is passed through citraconic acid anhydride, and said contacting is at normal pressure, at a temperature of between 100° C. and the boiling point of the citraconic acid anhydrde, for 2–6 hours.
4. Process according to claim 1, wherein in said contacting the citraconic acid anhydride and isoprene are each in liquid phase and are in the ratio of anhydride to isoprene of between 1:1 and 1:1.05, said polymerization inhibiting conditions are provided by 0.02%–0.1% of a polymerization inhibitor, and wherein said temperature is between 10–120° C., said pressure is superatmospheric, and said time is 5–48 hours.
5. Process according to claim 1, wherein said contacting is in the absence of a solvent.
6. A liquid isomeric mixture of 1,4-dimethyl-4-cyclohexene-1,2-dicarboxylic acid anhydride, 2,4-dimethyl-4-cyclohexene-1,2-carboxylic acid anhydride produced by a process comprising contacting isoprene with citraconic acid anhydride under conditions inhibiting polymerization at a temperature and pressure and for a time sufficient for reaction of said isoprene with said citraconic acid anhydride to produce said liquid mixture.
7. A liquid isomeric mixture of 1,4-dimethyl-cyclohexane, 1,2-dicarboxylic acid anhydride, 2,4-dimethyl-cyclohexane-1,2-carboxylic acid anhydride and then hydrogenating the product to produce a liquid isomeric mixture of 1,4-dimethylcyclohexane - 1,2 - dicarboxylic acid anhydried and 2,4-dimethylcyclohexane-1,2-dicarboxylic acid anhydrides.

References Cited
UNITED STATES PATENTS

| | | | |
|---|---|---|---|
| 3,346,597 | 10/1967 | De Acetis | 260—346.6 |
| 2,959,599 | 11/1960 | Bailey | 260—346.3 |

OTHER REFERENCES

Rivett, Journal of Applied Chem., vol. 1 (1951), pp. 377–379.

Kucherov et al., Chem. Abstracts (1960), vol. 54, 1351h.

Huang et al., Chem. Abstracts (1953), vol. 147, 12274g. and 12275g.

ALEX MAZEL, Primary Examiner

B. DENTZ, Assistant Examiner

U.S. Cl. X.R.

260—2, 346.3

UNITED STATES PATENT OFFICE
CERTIFICATE OF CORRECTION

Patent No. 3,745,179   Dated July 10, 1973

Inventor(s) Gunther Ibing, Kurt Neubold and Herbert Haferkorn

It is certified that error appears in the above-identified patent and that said Letters Patent are hereby corrected as shown below:

Col. 3, line 54

"38" hours should be -- 48 --

Col. 6, line 40

"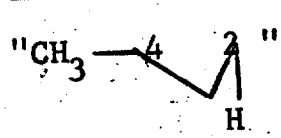"   should be --   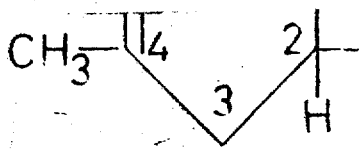

Signed and sealed this 15th day of October 1974.

(SEAL)
Attest:

McCOY M. GIBSON JR.
Attesting Officer

C. MARSHALL DANN
Commissioner of Patents

UNITED STATES PATENT OFFICE
CERTIFICATE OF CORRECTION

Patent No. 3,745,179  Dated July 10, 1973

Inventor(s) Gunther Ibing et al

It is certified that error appears in the above-identified patent and that said Letters Patent are hereby corrected as shown below:

Column 4, line 11

"dimtehyl" should be "dim<u>e</u>thyl"

Column 6, line 31

In the formula of isoprene there should be a double bond between C and $CH_2$.

Column 7, line 23

"anhydrde" should be "anhydr<u>i</u>de"

Signed and sealed this 20th day of May 1975.

(SEAL)
Attest:

RUTH C. MASON
Attesting Officer

C. MARSHALL DANN
Commissioner of Patents
and Trademarks